US012455355B2

United States Patent
Huang et al.

(10) Patent No.: US 12,455,355 B2
(45) Date of Patent: Oct. 28, 2025

(54) APPROACHES, APPARATUSES AND METHODS FOR LIDAR APPLICATIONS BASED ON-MODE-SELECTIVE FREQUENCY CONVERSION

(71) Applicant: THE TRUSTEES OF THE STEVENS INSTITUTE OF TECHNOLOGY, Hoboken, NJ (US)

(72) Inventors: Yuping Huang, Norwood, NJ (US); Yong Meng Sua, Fort Lee, NJ (US); Amin Shahverdi, Chandler, AZ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 1356 days.

(21) Appl. No.: 17/251,749

(22) PCT Filed: Jun. 13, 2019

(86) PCT No.: PCT/US2019/037088
§ 371 (c)(1),
(2) Date: Dec. 11, 2020

(87) PCT Pub. No.: WO2019/241582
PCT Pub. Date: Dec. 19, 2019

(65) Prior Publication Data
US 2021/0116543 A1  Apr. 22, 2021

Related U.S. Application Data

(60) Provisional application No. 62/684,697, filed on Jun. 13, 2018.

(51) Int. Cl.
*G01C 3/08* (2006.01)
*G01S 7/481* (2006.01)
(Continued)

(52) U.S. Cl.
CPC .......... *G01S 7/484* (2013.01); *G01S 7/4814* (2013.01); *G01S 7/4816* (2013.01);
(Continued)

(58) Field of Classification Search
CPC ...... G01S 7/484; G01S 7/4814; G01S 7/4816; G01S 7/4817; G01S 17/89; G01S 7/486;
(Continued)

(56) References Cited

U.S. PATENT DOCUMENTS 5,850,285 A  12/1998  Hill et al.
6,480,265 B2  11/2002  Maimon et al.
(Continued)

FOREIGN PATENT DOCUMENTS

CN  107070651 A1  11/2006
CN  202048988 U   11/2011
(Continued)

OTHER PUBLICATIONS

PCT International Preliminary Report on Patentability for PCT/US2019/037088, mailed on Dec. 15, 2020, 6 pages.
(Continued)

*Primary Examiner* — Samantha K Nickerson
(74) *Attorney, Agent, or Firm* — Clark Hill PLC; Ralph W. Selitto; John K. Kim

(57) ABSTRACT

Approaches, apparatuses and methods for LIDAR applications based on mode-selective frequency conversion are disclosed. In one embodiment, a pulse generation unit includes a mode-locked fiber laser and optical fiber bandpass filters. In the second embodiment, a LIDAR transceiver unit based on a simple, bidirectional monostatic coaxial arrangement using off-the-shelf telecom-grade optical components includes optical fiber, fiber collimator, optical fiber circulator, optical fiber isolator and wavelength combiner. A frequency conversion detection system with single photon
(Continued)

sensitivity includes a nonlinear optical material for frequency conversion, coupled with optimized pump pulses for efficient conversion and noise rejection, optical band pass filters for noise rejection and a single photon detection system for detecting the converted signal.

23 Claims, 9 Drawing Sheets

(51) Int. Cl.
G01S 7/484 (2006.01)
G01S 17/89 (2020.01)
G02B 26/08 (2006.01)
G02B 27/30 (2006.01)
G02F 1/37 (2006.01)

(52) U.S. Cl.
CPC ............ *G01S 7/4817* (2013.01); *G01S 17/89* (2013.01); *G02B 26/0833* (2013.01); *G02B 27/30* (2013.01); *G02F 1/37* (2013.01)

(58) Field of Classification Search
CPC .......... G01S 7/487; G01S 17/42; G01S 17/10; G02B 26/0833; G02B 27/30; G02F 1/37; G02F 1/35; G02F 1/365
See application file for complete search history.

(56) References Cited

U.S. PATENT DOCUMENTS

| | | | |
|---|---|---|---|
| 6,483,592 B2 | 11/2002 | Pedigo | |
| 7,567,596 B2 | 7/2009 | Dantus et al. | |
| 8,072,609 B1 | 12/2011 | Trivedi et al. | |
| 8,309,929 B2 | 11/2012 | Bond et al. | |
| 8,339,581 B2 | 12/2012 | Guha et al. | |
| 8,621,931 B2 | 1/2014 | Phua et al. | |
| 8,665,923 B2 | 3/2014 | Sprangle et al. | |
| 8,761,606 B2 | 6/2014 | Habif | |
| 9,596,421 B1 | 3/2017 | Itzler | |
| 9,696,133 B2 | 7/2017 | Yuan et al. | |
| 9,759,550 B2 * | 9/2017 | Wolf | G03F 7/7085 |
| 9,945,948 B2 | 4/2018 | Yang et al. | |
| 10,860,746 B2 | 12/2020 | Foster et al. | |
| 11,003,046 B2 | 5/2021 | Liscidini | |
| 11,264,775 B2 | 3/2022 | Huang | |
| 11,442,697 B2 | 9/2022 | Huang et al. | |
| 2002/0097962 A1 | 7/2002 | Yoshimura et al. | |
| 2004/0136634 A1 | 7/2004 | Chowdhury et al. | |
| 2005/0123242 A1 | 6/2005 | Walker | |
| 2006/0083379 A1 | 4/2006 | Brookner | |
| 2006/0245680 A1 | 11/2006 | Rasmussen et al. | |
| 2008/0138087 A1 | 6/2008 | Snyder | |
| 2009/0046296 A1 | 2/2009 | Kilpatrick et al. | |
| 2010/0124787 A1 | 5/2010 | Nitkowski et al. | |
| 2013/0036145 A1 | 2/2013 | Pruneri | |
| 2014/0098955 A1 | 4/2014 | Hughes | |
| 2014/0192363 A1 | 7/2014 | Kippenberg et al. | |
| 2015/0323450 A1 | 11/2015 | Lipson et al. | |
| 2016/0234017 A1 | 8/2016 | Englund | |
| 2017/0131388 A1 | 5/2017 | Campbell et al. | |
| 2018/0241480 A1 | 8/2018 | Hughes | |
| 2020/0257502 A1 | 8/2020 | Steinle | |
| 2020/0274703 A1 | 8/2020 | Lukens | |
| 2020/0285131 A1 | 9/2020 | Marandi et al. | |
| 2021/0080805 A1 | 3/2021 | Srinivasan et al. | |
| 2021/0156684 A1 | 5/2021 | Huang | |
| 2021/0247662 A1 | 8/2021 | Dorche et al. | |
| 2022/0075238 A1 | 3/2022 | Huang et al. | |
| 2023/0079367 A1 | 3/2023 | Huang et al. | |
| 2023/0155823 A1 | 5/2023 | Huang et al. | |
| 2023/0168563 A1 | 6/2023 | Huang et al. | |

FOREIGN PATENT DOCUMENTS

| | | |
|---|---|---|
| CN | 107528686 A | 12/2017 |
| CN | 111897054 A | 11/2020 |
| EP | 3477362 A1 | 6/2019 |
| EP | 3286603 B1 | 2/2020 |
| GB | 2510916 A | 4/2015 |
| JP | 4091956 B2 | 5/2008 |
| KR | 101899026 B1 | 10/2018 |
| WO | 2013112351 A2 | 8/2013 |
| WO | 2018031916 A1 | 2/2018 |
| WO | WO2021226395 A1 | 11/2021 |
| WO | WO2021231794 A1 | 11/2021 |
| WO | WO2023004148 A1 | 1/2023 |

OTHER PUBLICATIONS

Jason Lin et al., "Quantum private comparison of equality protocol without a third party", arxiv. org, vol. 13, No. 2, Oct. 1, 2013, pp. 239-247.

Goorden, Sebastianus & Horstmann, Marcel & Mosk, Allard & Skoric, Boris & Pinkse, Pepijn, "Quantum-Secure Authentication with a Classical Key", (2013).

Anapinis et al. "Quantum Physical Unclonable Functions: Possibilities and Impossibilities", Jun. 15, 2022, Quantum 5, 475 (2021). arXiv:1910.02126v4.

F. Xu, "Experimental fast quantum random number generation using high-dimensional entanglement with entropy monitoring", Optica 3, 1266-1269 (2016).

Hochrainer, "Low-Loss Optical Elements for a Loophole-Free Bell Test", 2014 (Thesis).

Lee, H., Chen, T., Li, J. et al. "Ultra-low-loss optical delay line on a silicon chip", Nat Commun 3, 867 (2012). https://doi.org/10.1038/ncomms1876.

Fiorentino, Marco & Munro, William & Santori, Charles & Spillane, Sean & Beausoleil, Ray. (2006). All-Fiber-Optic Quantum Random Number Generator. 1-2. 10.1109/CLEO.2006.4628717.

Nguyen L, Rehain P, Sua YM, Huang YP. "Programmable quantum random number generator without postprocessing", Opt Lett. Feb. 15, 2018;43(4):631-634. doi: 10.1364/OL.43.000631. PMID: 29444039.

Nguyen, Lac & Rehain, Patrick & Sua, Yong Meng & Huang, Yu-Ping. (2018), "Quantum Random Number Generator with Programmable Probability Distributions", JTu3A.30. 10.1364/FIO.2018.JTu3A.30.

Kumar, S., Zhang, H. & Huang, YP. "Large-scale Ising emulation with four body interaction and all-to-all connections", Commun Phys 3, 108 (2020). https://doi.org/10.1038/s42005-020-0376-5.

D. Pierangeli, G. Marcucci, and C. Conti, "Large-Scale Photonic Ising Machine by Spatial Light Modulation", Phys. Rev. Lett. 122, 213902—Published May 31, 2019.

Roques-Carmes, C., Shen, Y., Zanoci, C. et al. "Heuristic recurrent algorithms for photonic Ising machines", Nat Commun 11, 249 (2020). https://doi.org/10.1038/s41467-019-14096-z.

J. Lu, J. Surya, X. Liu, A. Bruch, Z. Gong, Y. Xu, and H. Tang, "Periodically poled thin-film lithium niobate microring resonators with a second-harmonic generation efficiency of 250,000%/W", Optica 6, 1455-1460 (2019).

Fu. Y., Guo, M., & Phua, P. B. (2010), "Spatially encoded multibeam laser Doppler vibrometry using a single photodetector", Optics Letters, 35(9), 1356-1358.

Yanlu Li, Jinghao Zhu, Matthieu Duperron, Peter O'Brien, Ralf Schüler, Soren Aasmul, Mirko de Melis, Mathias Kersemans, and Roel Baets, "Six-beam homodyne laser Doppler vibrometry based on silicon photonics technology," Opt. Express 26, 3638-3645 (2018).

Patrick Rehain, Jeevanandha Ramanathan, Yong Meng Sua, Shenyu Zhu, Daniel Tafone, and Yu-Ping Huang, "Single-photon vibrometry," Opt. Lett. 46, 4346-4349 (2021).

Jiuyi Zhang, Yong Meng Sua, Jia-Yang Chen, Jeevanandha Ramanathan, Chao Tang, Zhan Li, Yongxiang Hu, Yu-Ping Huang, "Carbon-dioxide absorption spectroscopy with solar photon counting and

(56) References Cited

OTHER PUBLICATIONS integrated lithium niobate micro-ring resonator", Appl. Phys. Lett. Apr. 26, 2021; 118 (17): 171103. https://doi.org/10.1063/5.0045869.

Tri Cao Doan, "Resonant Matter Wave Amplification in Mean Field Theory", arXiv: 1112.3325v1 Quantum Gases, Dec. 14, 2011.

Hu, Yi & Siviloglou, Georgios & Zhang, Peng & Efremidis, Nikolaos & Christodoulides, Demetrios & Chen, Zhigang. (2012), "Self-accelerating Airy Beams: Generation, Control, and Applications", 10.1007/978-1-4614-3538-9_1.

Yu-Ping Huang and Prem Kumar, "Mode-resolved photon counting via cascaded quantum frequency conversion", Opt. Lett. 38, 468-470 (2013).

Abijith S. Kowligy, Paritosh Manurkar, Neil V. Corzo, Vesselin G. Velev, Michael Silver, Ryan P. Scott, S. J. B. Yoo, Prem Kumar, Gregory S. Kanter, and Yu-Ping Huang, "Quantum optical arbitrary waveform manipulation and measurement in real time," Opt. Express 22, 27942-27957 (2014).

Jingle Liu, Jianming Dai, and X.-C. Zhang, "Ultrafast broadband terahertz waveform measurement utilizing ultraviolet plasma photoemission," J. Opt. Soc. Am. B 28, 796-804 (2011).

R. Sferopoulos, "A Review of Chemical Warfare Agent (CWA) Detector Technologies and Commercial-Off-The-Shelf Items," DSTO Defence Science and Technology Organisation, Fishermans Bend, Victoria, Australia (2009).

Scully, et al., "Quantum Optics," Published by Cambridge University Press, 1997.

Huang, et al., "Heralding single photons without spectral factorability", Phys. Rev. A 82, 043826 (2010).

Seth Lloyd, "Enhanced Sensitivity of Photodetection via Quantum Illumination", Science 321, 1463-1465 (2008). DOI:10.1126/science.1160627.

U.S. Appl. No. 17/899,493, filed Aug. 30, 2022, titled Approaches, Apparatuses, and Methods for Non-Interferometric Quantum Photonics Vibrometry. Yuping Huang et al.

PCT International Search Report and Written Opinion for PCT/US2019/037088, mailed on Feb. 10, 2019, 9 pages.

Shaverdi, Amin et al., "Mode Selective up-conversion detection for LIDAR applications," Optics Express, vol. 26, No. 12, Jun. 8, 2018.

Geiser, P. et al., "A subnanosecond pulsed laser-source for mid-infrared LIDAR", Applied Physics B; Lasers and Optics, Springer, Berlin, Germany, vol. 83, No. 2, May 1, 2006.

Shahverdi, Amin et al., "Quantum Parametric Mode Sorting: Beating the Time-Frequency Filtering," Scientific Reports, vol. 7, No. 1, Dec. 2017.

\* cited by examiner

APPROACHES, APPARATUSES AND METHODS FOR LIDAR APPLICATIONS BASED ON-MODE-SELECTIVE FREQUENCY CONVERSION

CROSS-REFERENCE TO RELATED APPLICATIONS

This application is a national stage entry under 35 U.S.C. § 371 and claims priority to PCT International Patent Application No. PCT/US2019/037088, filed Jun. 13, 2019, which claims the benefit of and priority to U.S. Provisional Patent Application No. 62/684,697, the entire disclosures of which are incorporated herein by reference.

STATEMENT REGARDING FEDERALLY SPONSORED RESEARCH

This invention was made with government support under contract number W15QKN-18-D-0040 awarded by The Army Contracting Command—NJ and grant number N00014-15-1-2393 from the Office of Naval Research. The government has certain rights in the invention.

FIELD OF THE INVENTION

The present invention generally relates to using nonlinear optics to enhance the signal-to-noise ratio and sensitivity of detecting an optical signal, and, specifically, relates to approaches, apparatuses and methods for performing the same for light detection and ranging (LIDAR) applications.

BACKGROUND OF THE INVENTION

High sensitivity and selective detection of optical signals over background noise is essential to optical measurement-based applications such as imaging, optical communications, LIDAR, remote sensing, and spectroscopy. This is especially true for detecting weak optical signals such as single photon under strong noise conditions. Conventionally, time-frequency (spectral) filtering has been the standard approach for the optimal detection of optical signals. However, it is far from ideal as signal detection efficiency needs to be sacrificed to reduce the amount of undesirable noise detected simultaneously, and vice versa. In reality, optical signal detection is often swamped with different sources of noise, whether they are from the light source, ambient environment, or the photodetector itself.

SUMMARY OF THE INVENTION

The present invention describes approaches, apparatuses and methods for LIDAR applications based on mode-selective frequency conversion, which is based on engineering a parametric nonlinear optical process to convert the frequency of the received signal in a desired spectral-temporal mode for subsequent detection. In contrast, the received background noise in undesirable spectral-temporal modes, are not translated or are translated inefficiently. In an embodiment, a LIDAR system with picosecond probe pulses and pump pulses for such frequency conversion are derived from a femtosecond mode-locked fiber laser with wavelength tunability across the entire telecom C-band. In some embodiments, the LIDAR system used in the present invention is based on a simple monostatic coaxial (bidirectional) arrangement using off-the-shelf, cost effective telecom-grade optical components. In some embodiments, the system includes a frequency conversion detection module that has a detection threshold of single photon level and has a commercial lithium-niobate waveguide module, optical band-pass filters, and a silicon avalanche photo detector or photodiode (Si-APD). In some embodiment, the frequency conversion detection module has a minimum detection efficiency of 4.5%, a dynamic range of 63 dB, with 41 dB advantage in compared to that of direct photon detection using a commercial InGaAs-avalanche photo diode. In some embodiments, a ranging resolution of the LIDAR system is better than 1 millimeter and maximum probe ranging of km range depending on the repetition rate and optical power level of the probe signals.

In some embodiments, in an environment with multiple LIDAR users, each can be assigned specific pulse shapes (as pump and probe signals) from an orthogonal basis. The optical pulses (probe and pump) are carved from a femtosecond laser and can be tailored in specific shapes through a set of optical filters.

In some embodiments, the pulse repetition rate of the generated pulses can be set within the laser or by employing a pulse picking system.

In some embodiments, the optical system is integrated in a free-space or fibers or photonic integrated circuits.

In some embodiments, a system includes a pulse generation unit configured to create probe signals and trigger a diving pump in waveforms having pulsed amplitude and phase profiles; a timing unit configured to temporally align the pump with backscattered signals of the created probe signals; a collimation and scanning unit configured to collimate the probe signals and collect the backscattered signals; and a mode selective detection unit configured to perform mode-selective frequency conversion of the collected backscattered signals and detect the converted signals.

In some embodiments, the mode selective detection unit is configured to translate a frequency of the collected backscattered signals from an infrared wavelength to a visible wavelength, to filter the translated signals and perform up-conversion of the filtered signals, and to detect the up-converted signals.

In some embodiments, the mode selective detection unit includes a nonlinear optical (NLO) module configured to translate the frequency of the collected backscattered signals from a near-infrared (NIR) or mid-infrared (MIR) wavelength to a visible wavelength.

In some embodiments, the mode selective detection unit further includes a spectral filtering module configured to filter the translated signals and perform up-conversion of the filtered signals.

In some embodiments, the mode selective detection unit further includes a silicon avalanche photo detector (Si-APD) configured to detect the up-converted signals.

In some embodiments, the pulse generation unit comprises a femtosecond mode-locked fiber laser together with a set of wavelength division multiplexing (WDM) filters to carve out required waveforms.

In some embodiments, the pulse generation unit comprises an optical frequency comb generator and a reconfigurable optical processor to create the pump in waveforms having the amplitude and the phase profiles.

In some embodiments, the timing unit is configured to implement an optical delay line. In one embodiment, the optical delay line can be scanned by mechanical or optical-switching means.

In some embodiments, the collimation and scanning unit includes a scanning module configured to implement micro electro mechanical system (MEMS) based mirrors.

In some embodiments, a control and processing unit is provided to control the operation of the pulse generation unit, the timing unit, the collimation and scanning unit, and/or the mode selective detection unit. The control and processing unit can be configured using integrated electronic circuits such as field programmable gate arrays (FPGA).

In some embodiments, a method includes the steps of creating probe signals and triggering a driving pump in synchronized waveforms having properly pulsed amplitude and phase profiles; collimating the probe signals, directing the probe signals to a target, and collecting backscattered signals of the probe signals; temporally aligning the driving pump with the backscattered signals of the created probe signals; performing mode-selective frequency conversion of the collected backscattered signals; and detecting the converted signals.

In some embodiments, the performing step includes the steps of translating a frequency of the collected backscattered signals from an infrared wavelength to a visible wavelength and filtering the translated signals and perform up-conversion of the filtered signals.

In some embodiments, the performing step is performed using a mode selective detection unit which includes a nonlinear optical (NLO) module configured to translate the frequency of the collected backscattered signals from a near-infrared (NIR) or mid-infrared (MIR) wavelength to a visible wavelength.

In some embodiments, the mode selective detection unit further includes a spectral filtering module configured to filter the translated signals and perform up-conversion of the filtered signals.

In some embodiments, the mode selective detection unit further includes a silicon avalanche photo detector (Si-APD) configured to detect the up-converted signals.

In some embodiments, the steps of creating the probe signals and triggering the driving pump are performed using a pulse generation unit including a femtosecond mode-locked fiber laser together with a set of wavelength division multiplexing (WDM) filters to carve out required waveforms.

In some embodiments, the creating step is performed using a pulse generation unit including an optical frequency comb generator and a reconfigurable optical processor to create the pump waveforms having the amplitude and the phase profiles.

In some embodiments, the temporally aligning step is performed using a timing unit configured to implement an optical delay line. In one embodiment, the optical delay line can be scanned by mechanical or optical line.

In some embodiments, the collimating step is performed using a collimation and scanning unit which includes a scanning module configured to implement a micro electro mechanical system (MEMS) based mirror or mirrors or a digital micro-mirror device or devices (DMD).

In some embodiments, the creating step is performed using a pulse generating unit, the temporally aligning step is performed using a timing unit, the collimating step is performed using a collimation and scanning unit, and the performing and detecting steps are performed using a mode selective detection unit. A control and processing unit is provided for controlling the operation of the pulse generation unit, the timing unit, the collimation and scanning unit, and/or the mode selective detection unit.

BRIEF DESCRIPTION OF THE DRAWINGS

In the drawing figures, which are not to scale, and where like reference numerals indicate like elements throughout the several views:

FIG. 8(*c*) is a graph illustrating selection efficiencies of the first three signal modes $\{\zeta_i\}$ for the TF filter in (a) and $\{\eta_i\}$ for the PMSD system in FIG. 8(*b*), as a function of the time-bandwidth product according to some embodiments of the present disclosure.

DETAILED DESCRIPTION OF EMBODIMENTS OF THE INVENTION

Figure 1:
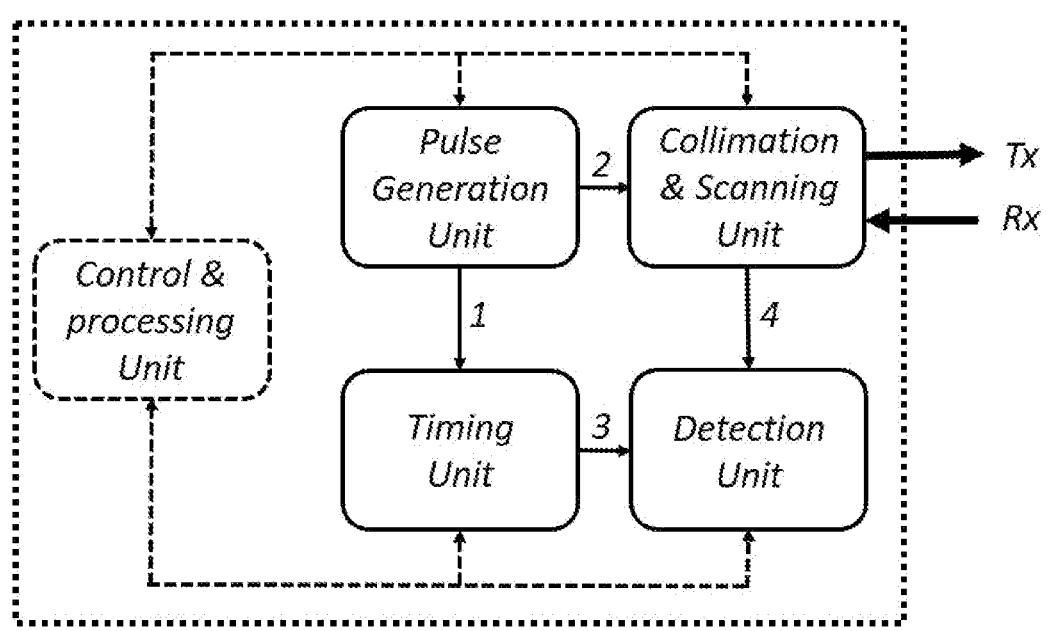
FIG. 1 is a schematic view of apparatus for LIDAR application in accordance with an embodiment of the present disclosure.

The present invention can be further explained with reference to the included drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

LIDAR has been used successfully in the defense industry and gaining ground in the commercial industry with a vast variety of applications. Precise optical time-of-flight (ToF) measurement with short laser pulses and a photodetector operated in the linear regime has become the key enabling technology for conventional LIDAR. On the other hand, highly sensitive Geiger mode single-photon detectors (SPDs) operating in various spectral regimes have been introduced to measure the backscattered signals at a single or few-photon level. They can significantly extend the measurement range and increase spatial resolution for unprecedented LIDAR capabilities. Static scanning LIDAR is used for acquiring data indoors, which facilities monitoring and providing as-built monitoring of large scale industrial sites or open pit mines safety surveying. In contrast, kinematic laser scanning from mobile platforms such as aircraft, automobile or marine vessels, manned or unmanned, is used mainly for acquiring 3D data over an extended range and area, up to hundreds of meters in distance and few tens of kilometers square in area. One of the specific strengths of LIDAR technology, in contrast to, e.g., photogrammetry, is the high sensitivity and resolution (see, e.g., U.S. Pat. No. 9,596,421 entitled "Apparatus Comprising A High Dynamic Range Single-Photon Passive 2D Imager and Methods therefor" and U.S. Patent Application Publication No. 2017/0131388 entitled "LIDAR System with Improved Scanning Speed for High-Resolution Depth Mapping", the entire disclosures of both of which are incorporated herein by reference). Notably, foliage penetrating LIDAR has been used to reveal fine topographical details in archaeological survey, and long range LIDAR is being adopted by the automotive industry edging toward level-5 fully autonomous driving. By a leverage on tremendously higher sensitivity and resolution than conventional LIDAR, Geiger-mode avalanche mode single-photon detectors base LIDAR is a major force in commercial 3D terrain mapping from high altitudes.

In an exemplary LIDAR system, probing optical pulses are sent out where as an element can scatter or absorb the probing optical pulses to provide information on, but not limited to, its location, reflectance, refractive index, optical depth, chemical composition, surface morphology via the backscattered light. Then, the backscattered light will be detected by using a photodetector to determine the aforementioned properties of the probed elements. One of the specific strengths of LIDAR technology, in contrast to, e.g., photogrammetry, is the high sensitivity and resolution. However, a highly sensitive photodetector is required to detect weakly backscattered signal from an element by virtue of a far distance, low reflectance, high loss in the light propagation path, noisy environment, or a combination of these factors. Nonetheless, to exploit such high sensitivity, false-alarming noise photon counts—which can arise from the ambient emission (such as solar background), active light sources, and intrinsic dark counts of the APD itself—need to be aggressively suppressed, so that the backscattered signal is statistically distinguishable from the noise. In addition, most single-photon detectors suffer dead time, where they need time to recover after each detection event, and get ready for the next detection. Thus, a significant level of noise photon counts may cause the detectors to miss the true signal photons that arrive during the dead time interval caused by the noise photons. LIDAR systems operating below 1.0 μm wavelength regime are overly restricted in the deployable optical power due to eye-hazard risks and distraction to human vision. In addition, it is also susceptible to ambient emission during daylight operation due to high solar background, thereby limiting their range and usefulness.

In contrast, long-wavelength LIDAR in the near-IR regime (between 1.0 μm and 2.0 μm) can benefit from much lower solar background and atmospheric attenuation, while exploiting an eye-safe window around 1.5 μm for high power operation. Coincide with telecommunication wavelengths, high power laser and optical amplifier along with optical components for 1.5 μm are widely available and cost efficient. However, 1.5 μm LIDAR is fundamentally constrained by the intrinsic dark counts of the InGaAs APDs, which is usually several orders of magnitude higher than the Si-APD even with aggressive measures for dark count suppressing such as electrical gating and thermo-electric cooling. One example of such system was built by ID Quantique. While those difficulties have recently shown to be addressed by using superconducting SPDs, e.g., one such system that requires cryogenic cooling and meticulous temperature control, high cost and massive presence impede their uses in practical LIDAR applications.

To deploy LIDAR with eye-safe wavelengths while taking advantage of low solar background and reduced atmospheric scattering, up-conversion detection has emerged as a viable alternative by first transducing the near-IR (long wavelength) photons to the visible (short wavelength) and then detection using Si-APDs (see, e.g., Chinese Patent Publication No. CN202048988U entitled "High-sensitivity up-conversion single photon detecting system", the entire disclosure of which is incorporated herein by reference). The up-conversion detection may be accomplished through but not limited to sum-frequency generation (SFG) in a nonlinear optical material where a pump wave—either in a continuous wave (CW) or pulse mode—is employed to translate the wavelength of the backscattered photons from near-IR to visible.

The approaches, apparatuses and methods disclosed herein demonstrate improvement in LIDAR applications by using both the pump and signal in the telecom band and a periodically poled lithium niobate (PPLN) waveguide for mode-selective up-conversion, as discussed in Shahverdi et al., "Mode Selective Up-conversion Detection for LIDAR Applications", *Opt. Express*, Vol. 26, Issue 12, pp. 15914-15923 (2018), which is incorporated herein by reference in its entirety. However, other wavelength configurations and nonlinear devices can be also be used to demonstrate the same or similar benefits. For example, the techniques and approaches disclosed hereby can be applied to the signals in visible or other spectrum bands, to achieve similar benefits and advantages for underwater, near water, and other free-space applications. In one embodiment, the signal is converted from its original visible wavelength to a different visible wavelength for the mode selectivity and/or a higher detection efficiency by a Si-APD. In another embodiment, the signal is converted from an infrared wavelength to a near-infrared wavelength for the mode selectivity and higher detection efficiency.

In some embodiments, 1555.7 nm signal pulses and a PPLN waveguide are used for the up-conversion. Unlike some other studies where inconvenient, far red-detuned pump lasers at around 2 µm are required to reduce Raman scattering noise, the present invention uses pump pulses at 1545.3 nm to convert the signal to 775.3 nm according to some embodiments. This is feasible because the use of picosecond pulses for the mode-selectivity also substantially reduces the Raman noise.

Using both the pump and signal in the telecom band, the present invention takes advantage of current compact laser and fiber components to realize a practical and cost-effective LIDAR system. By approaching the phase matching bandwidth of the PPLN waveguide using picosecond optical pulses, the present invention shows that only photons in a single spectral spatio-temporal mode, similar to the pump pulse shape in this case, are converted efficiently while background noise photons in all other modes are rejected, thereby exhibiting significantly enhanced measurement SNR compared to direct detection using an InGaAs-APD. This system may be called a parametric mode sorter detector (PMSD). It achieves a dynamic range of >63 dB and a total detection efficiency of 4.5% for single photons. The picosecond pulses also lead to remarkable around 1 mm ranging resolution, which goes well beyond the limit of timing resolution for the Si-APD and electronic readout jitter of the entire system. This resolution is achievable upon an up-conversion and detection of picosecond single photons, which is in contrast to other approaches relying on detecting bright signal pulses and post-processing.

For high conversion efficiency, the pump and signal are routinely prepared in narrowband spectral profiles well contained in the SFG phase matching band. Oppositely, it has been shown that by using instead broadband pump pulses whose spectral width is comparable to the phase matching bandwidth of nonlinear optical material, thus realizing mode selective detection. With this, only optical signal in single time-frequency mode are converted efficiently but the signals in all other modes, including those spanning the exact same spectrum and time of arrival, are converted with much lower efficiency. This developed technique can be applied for any photon detection system to enhance the signal-to-noise ratio as applies in the present LIDAR system, in which one can selectively up convert the backscattered probed pulse with high conversion efficiency while rejecting the noise signal in other modes.

The approaches, apparatuses and methods disclosed herein has utilized this effect to significantly improve the signal-to-noise ratio by 13 dB compared to conventional time-frequency filter in detecting a weak signal in a single mode swamped by strong broadband noise randomly distributed in many modes.

The approaches, apparatuses and methods disclosed herein utilizes, in some embodiments, technique of quantum parametric mode sorting based on nonlinear optics at the edge of phase matching is used to improve a tradeoff between the selection (detection) efficiency (i.e., the signal transmittance through the filter to the detector) and the noise rejection, as discussed in Shahverdi et al., "Quantum Parametric Mode Sorting: Beating the Time-Frequency Filtering", *Scientific Reports*, Vol. 7, No. 1 (published online Jul. 26, 2017), which is incorporated herein by reference in its entirety. This approach, based on nonlinear wave mixing intended to improve the tradeoff inherent with time-frequency (TF) filters, enables faithful measurement and processing of weak signals even in the presence of strong interfering noise. In addition, this approach has the sensitivity down to single-photon level.

Another field that requires a high signal to noise ratio while needing a highly sensitive detection system is quantum information processing, whereas quantum signals, often in very low mean photon numbers, are inherently in a single mode. Therefore, having a highly sensitive detection system with the capability of distinguishing the quantum signal from the noise is extremely challenging. The fundamental trade-off imposed by the time frequency filtering makes the measurement of quantum signals even more challenging, which can benefit significantly from a mode-selective, yet highly sensitive detection system. For instance, enhancing the SNR of single photon detection would be a valuable step in overcoming performance limitations of commercial InGaAs single-photon detectors in the telecom band and photo detection systems in mid-IR wavelength where highly sensitive and low noise detector is not available.

In addition, another area that can benefit from the selective detection of optical signals with single photon sensitivity is the ultra-low light or single photon level imaging which are of interest of plethora applications in biomedical, manufacturing, public safety, national security and fundamental science. Particularly, in the non-line-of-sight imaging system where the scene of interest is indirectly accessible via low-light level reflections off intermediary surfaces.

The approaches, apparatuses and methods disclosed herein also address the deficiencies in many applications which are limited by the presence of noise from any sources and sensitivity of optical signal detection. In particular, detection limitations of optical signals, in term of sensitivity and signal-to-noise ratio are major obstacles for many applications, such as limited sensing range and resolution of LIDAR, inefficacy in detecting of elements in low concentration, limited spatial resolution and dynamic range in optical imaging. For example, the detection sensitivity and ranging accuracy of the approaches, apparatuses and methods disclosed herein can be used for long distance, non-contact laser vibrometry with eye-safe lasers. With a single-photon-level detection sensitivity, the vibration amplitude and frequency of remote objects/infrastructures can be monitored in real time and from tens of kilometers away. In addition, the approaches, apparatuses and methods herein can be applied for optical time domain reflectometry with optical fiber network, with applications such as high resolution distributed temperature and vibration sensing, where the mechanical or acoustic impedance will induce physical changes on the backscattered probe pulses.

The approaches, apparatuses and methods disclosed herein improve signal-to-noise via an optical parametric process in a nonlinear waveguide. The ranging resolution is determined by the pulse width of the generated optical pulses and is not limited by the timing resolution of the avalanche photo detector nor the electronic timing jitter of entire detection system. The signal to noise can be further improved by employing an optical arbitrary waveform generator to generate a specific pulse shape for different applications. The improvement in signal-to-noise ratio and timing resolution by the proposed system is tested in comparison with commercial detectors.

The approaches, apparatuses and methods disclosed herein take advantage of a compact laser source and fiber components to realize a practical and cost-effective system for various LIDAR applications. The exceptional noise suppression feature of the frequency conversion detection can be useful in weakly-illuminated systems, photon starved environments, or crosstalk and interference susceptible applications, with examples in imaging or identifying an object occluded by a highly reflective surface or surrounded by a thick fog.

FIG. 1 shows an optical transceiver system including electro-optical systems (i.e., a pulse generation unit; a timing unit; a collimation and scanning unit; and a detection unit) according to an embodiment of the present subject matter. Each of these electro-optical systems is controlled and commanded by a control and processing unit to (1) trigger and generate pump; (2) trigger and generate a probe signal; (3) delay the pump; and/or (4) receive and detect the signal.

The pulse generation unit (see FIG. 1) is configured to create a probe signal and trigger pump waveforms in desirable amplitude and phase profiles. When a transceiver is employed for ranging applications in LIDAR, the pulse repetition frequency (PRF) of the generated pulses determines the maximum range $$\left(R = \frac{\text{Speed of light}}{2 \times PRF}\right)$$

that a target can be detected without ambiguity. An exemplary configuration for this unit may include a femtosecond fiber laser together with a set of wavelength division multiplexing (WDM) filters to carve out the required waveforms. An erbium doped fiber amplifier (EDFA) may be implemented to achieve required power either for probe or driving the pump. In this case, the PRF is determined by the laser; however it can be down converted by using an electro-optical modulator driven at a desired frequency to get a lower PRF. Another exemplary configuration for this unit may include an optical frequency comb generator and a reconfigurable optical processor (also called waveshaper) to create waveforms in desirable amplitude and phase profiles. The same techniques as in the first example might be employed to achieve a desired power and PRF.

The timing unit (see FIG. 1) is configured to temporally align the driving pump with the received signal (also called backscattered signal in LIDAR applications). It is used to determine the arrival time (or time of flight) of the received signal. This unit may be realized by implementing an optical delay line. An exemplary optical delay line is SSTD-085121303-1 by Agiltron which is an 8 bits variable delay line module, with 156 ps increment, and the total delay of 39.78 ns. Another example is HD4 by MS Fitel which is a high-resolution delay line with a scan range of 350 ps and resolution of 0.001 ps. In order to speed up the scanning time and maintaining the required resolution, these two modules may be combined where the former one is firstly used for coarse ToF measurement and then the later one is implemented for fine measurement. In this case a long driving pump pulse is employed at the beginning in which its width needs to be shortened for the fine measurements.

The collimation and scanning unit (see FIG. 1) is configured to collimate the probe signal and collect backscattered signal. This unit also steer the beam in both azimuth and elevation angles. This unit takes the probe signal as an input and transmits it towards the target. It also collects the received backscattered signal and directs it toward the detection unit (see FIG. 1). In one embodiment, the collimation module can be realized in mono-static or bi-static structure. An exemplary mono-static configuration for the collimation module may include a fiber to free space collimator and a 3-port optical circulator with high isolation, e.g. >55 dB, to separate probe and received signals. On the other hand, the scanning module may be realized by implementing micro electro mechanical system (MEMS) based mirrors. An exemplary MEMS mirror might be a semi-custom development kit (P/N: DK-016) by Mirrorcle Technology Inc. It can provide a 12° degree scan angle in both azimuth and elevation with 0.001° pointing accuracy. The scanning speed of this development kit is 300 Hz. Other options for the scanning module includes programmable spatial light modulators, MEMS optical phased arrays, solid state optical phase arrays, and liquid crystal electro-optic scanners.

Figure 2:
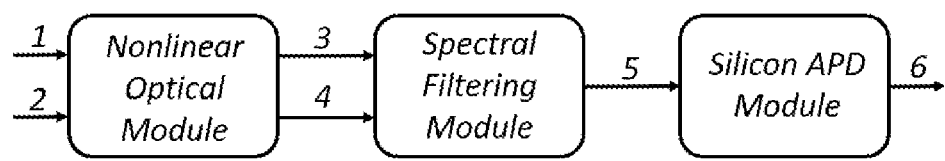
FIG. 2 is shows a detection unit according to an embodiment of the present disclosure.

Hereafter, a mode selective detection unit as the heart of the transceiver is described according to a general and also exemplary embodiment of the invention. FIG. 2 shows a detection unit according to an embodiment of the present subject matter. The detection unit includes but not limited to (1) signal (NIR/MIR/Visible wavelength), (2) pump to drive the frequency conversion (NIR/MIR wavelength), (3) the residual pump (NIR/MIR wavelength), (4) the converted signal and undesirable light created by the pump not in the spectral band of the converted signal (visible/NIR wavelength), (5) the converted signal, and (6) photon detection and generation of electrical pulse signal (low frequency) to processing unit. As shown in FIG. 2, a mode selective detection system includes a nonlinear optical (NLO) module which is configured to translate the frequency of the received signal, whose original wavelength could be of NIR, MIR, visible, or ultraviolet, to a different wavelength, a spectral filtering module that is configured to operate as a narrow bandpass filter for the converted signal, and a silicon avalanche photo detector (Si-APD) designed to detect signals at single photon level and generate electrical pulse signal upon each detection.

The NLO module takes the received signal and the driving pump as two inputs and generates the output at the sum frequency, or difference frequency, of two inputs. The undesirable light generated simultaneously by the driving pump, such as its second harmonic light, together with the residual driving pump are also exiting and are filtered through the spectral filtering module. By controlling and tailoring amplitude and phase profile (waveform) of the driving pump in the NLO module, only the received signal in a specific spectral-temporal profile (mode) is efficiently converted during the frequency translation (conversion) process and the received light, including those from background, in all other orthogonal modes is rejected or translated with much lower efficiency. This phenomenon is at the core of the presented invention as the desirable signal is defined in a single spectral-temporal mode while broadband noise spans many orthogonal modes. By employing the NLO module only the desirable signal is efficiently translated to the visible wavelength, and the noise is strongly rejected as its constructing modes are not efficiently translated or converted.

The spectral filtering module takes all outputs from the NLO module as inputs. In one embodiment, at the first step, the input light signal and broadband noise that are not frequency translated by the NLO module, as well as the residual driving pump, are filtered out with high extinction. Then, the undesirable light created by the driving pump in the NLO module is removed with high extinction. This leaves mostly the desirable, converted signal to the single photon detection module. In some embodiments, the rejection of these various lights other than the converted signal is accomplished by passing through a compound filtering system, including those realized in optical fibers and integrated photonic devices.

The Si-APD module detects short-wavelength photons below 1.0 μm with high efficiency and low noise. An exemplary detector is ID100 by ID Quantique with detection efficiency as high as 35% and dark count rate<5 Hz.

Figure 3:
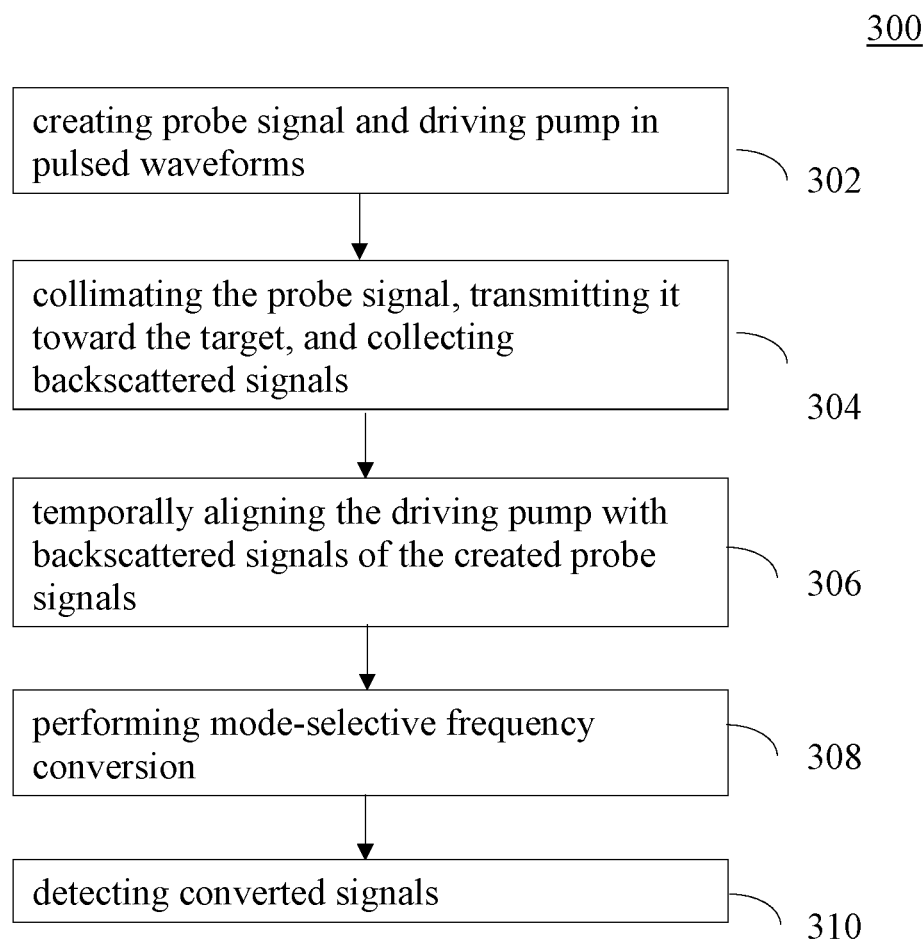
FIG. 3 is a flowchart illustrating steps performed using the optical transceiver system described in FIGS. 1 and 2 according to some embodiments of the present disclosure.

FIG. 3 is a flowchart 300 illustrating steps performed using the optical transceiver system described in FIGS. 1 and 2 according to some embodiments. The method begins with step 302 in which the pulse generation unit of FIG. 1 creates probe signal and driving pump in synchronized waveforms in the desirable amplitude and phase profiles. At step 304, the collimation and scanning unit of FIG. 1 collimates the probe signal, directs it to the target, and collects backscattered signal. At step 306, the timing unit of FIG. 1 temporally aligns the driving pump with the received signal to determine the arrival time (or time of flight) of the received signal. At step 308, the mode selective detection unit of FIG. 1 performs frequency conversion of the filtered signals and detects the up-converted signals.

Example Device Configuration I:

In some embodiments, an exemplary configuration for the proposed transceiver described herein is employed for LIDAR applications. In the detection unit, the NLO module is realized by implementing a 2-cm PPLN waveguide with second order nonlinearity according to an embodiment. In some embodiments, this waveguide is configured to take inputs at telecom C-band and generate sum frequency at visible wavelength with the conversion efficiency of 140% $W^{-1}.cm^{-2}$. In some embodiments, the phase matching bandwidth of this waveguide is 90 GHz at full-width half-maximum centered at 1550.6 nm. So, the wavelengths of the received signal and driving pump are set at 1555.7 nm and 1545.3 nm, respectively, in accordance with some embodiments. In some embodiments, the driving pump is a 6-ps Gaussian pulse. Based on this configuration, only received signal in a Gaussian waveform with the pulse width of 6 ps is efficiently up-converted to the sum frequency wavelength of 775.3 nm, so the desire signal is also defined to be a 6-ps Gaussian pulse in accordance with some embodiments.

Figure 4:
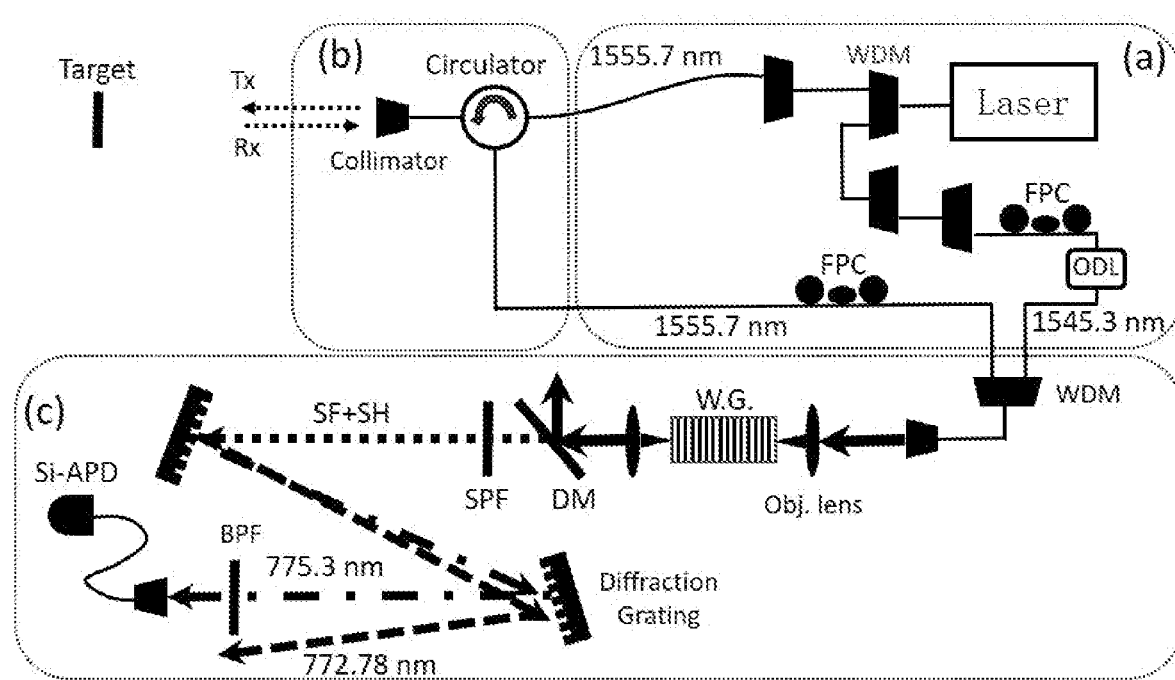
FIG. 4 shows an exemplary demonstration of (a) pulse generation and timing units, (b) a collimation and scanning unit and (c) a detection unit according to an embodiment of the present disclosure.

FIG. 4 shows an exemplary demonstration of (a) pulse generation and timing units, (b) a collimation and scanning unit and (c) a detection unit according to an embodiment of the present subject matter. In some embodiments, the 6-ps pulses are created by a pulse generation unit where two pulses are spectrally carved from a high power femtosecond mode-locked laser (pulse repetition rate of 50 MHz by Calmar Laser) by using a set of WDM filters, as indicated by dotted box (a) in FIG. 4. In some embodiments, a programmable optical delay line (HD4 by JDS Fitel) with the scan range of 350 ps and resolution of 0.001 ps is used to realize the timing module.

The collimation unit is based on a simple monostatic coaxial arrangement using off-the-shelf telecom-grade optical components. Collimated probe pulses in a Gaussian spatial mode (beam diameter: 2.2 mm) at 1555.7 nm are transmitted toward the target through a configuration including a fiber-to-free space collimator and a 3-port fiber optic circulator, as indicated by dotted box (b) in FIG. 4. In some embodiments, an angle polished fiber connector and anti-reflection coated aspheric collimation lens are used to minimize the Fresnel reflection within the collimator. In some embodiments, the circulator separates the outgoing probe signal pulses and the incoming backscattered photons with minimum isolation of 55 dB. This bidirectional design reduces the number of optical components while simplifying the optical alignment, as the transmitter and receiver optics share a common optical axis. In some embodiments, the mixed noise and backscattered photons are sent to the PPLN waveguide for PMSD, as indicated by dotted box (c) in FIG. 4.

In some embodiments, for the all-in-fiber configuration, the PMSD in FIG. 4 (dotted box (c)) can be realized by using fiber optics component including pig-tail waveguide and in-line filters.

In the detection unit (see dotted box (c) in FIG. 3), both the received signal and driving pump are first passed through fiber polarization controllers and then combined in a WDM filter before coupling into the nonlinear waveguide, in accordance with some embodiments. In the spectral filtering module, the up-converted signal is separated from the driving pump by using a dichroic mirror followed by a short pass filter. Then signal is further guided through one band pass and two double-grating filters with a center wavelength at 775.3 nm and a total full-width half-maximum bandwidth of 1 nm, in accordance with some embodiments. This eliminates any out-of-band noise including those from the second harmonic generation by the driving pump in the PPLN waveguide. Finally, the up-converted photons are detected in Si-APD module by using a fiber coupled, ultralow noise Si-APD, in accordance with some embodiments.

Figure 5:
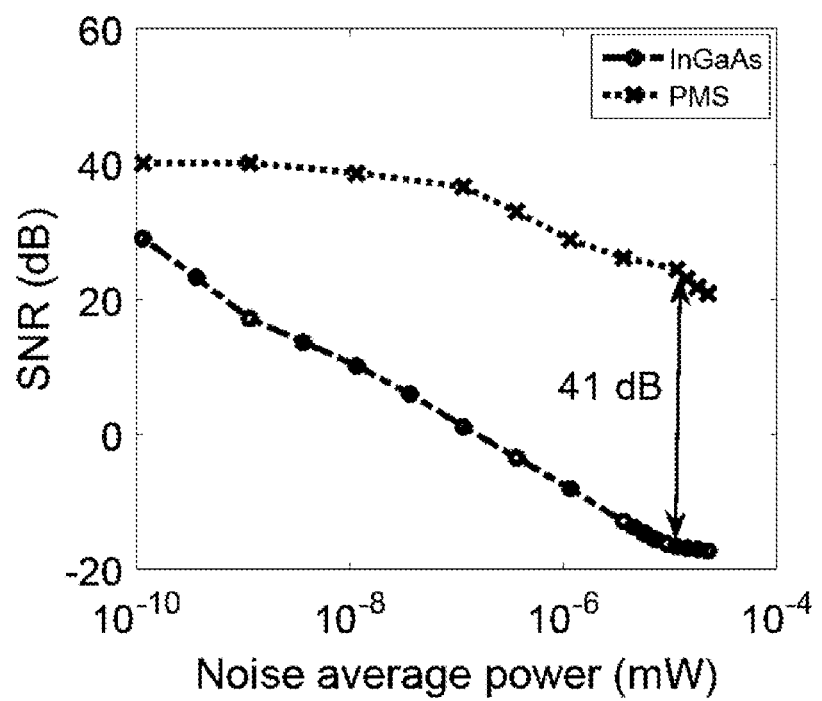
FIG. 5 shows exemplary measurement results where a signal-to-noise ratio is measured against noise power employing the present invention and direct detection by an InGaAs-Avalanche Photodiode according to an embodiment of the present disclosure.

The performance of the mode selective detection unit in the presence of the broadband noise is compared with direct detection, which can be realized by employing InGaAs-APD. FIG. 5 shows exemplary measurement results where the signal-to-noise ratio is measured against the noise power employing the technique in this invention and direct detection by the InGaAs-APD according to an embodiment of the present subject matter. The experimental results in FIG. 5 show that the detection technique in this invention effectively improves the SNR by as much as 41.4 dB according to some embodiments.

To demonstrate the ranging resolution of the transceiver for LIDAR applications, in some embodiments, the present invention attempts to resolve a thickness of a~1 mm microscope glass slide by retrieving the ToF of Fresnel reflections at each of air-glass and glass-air interfaces. The card board is placed at $L_1$=890 mm and the glass slide with the measured thickness of t=1.15 mm is placed in front of it. The distance between the rear surface of the glass and the card board is $L_2$=6 mm. First, the backscattered photons are detected by mode selective technique without the glass.

Figure 6:
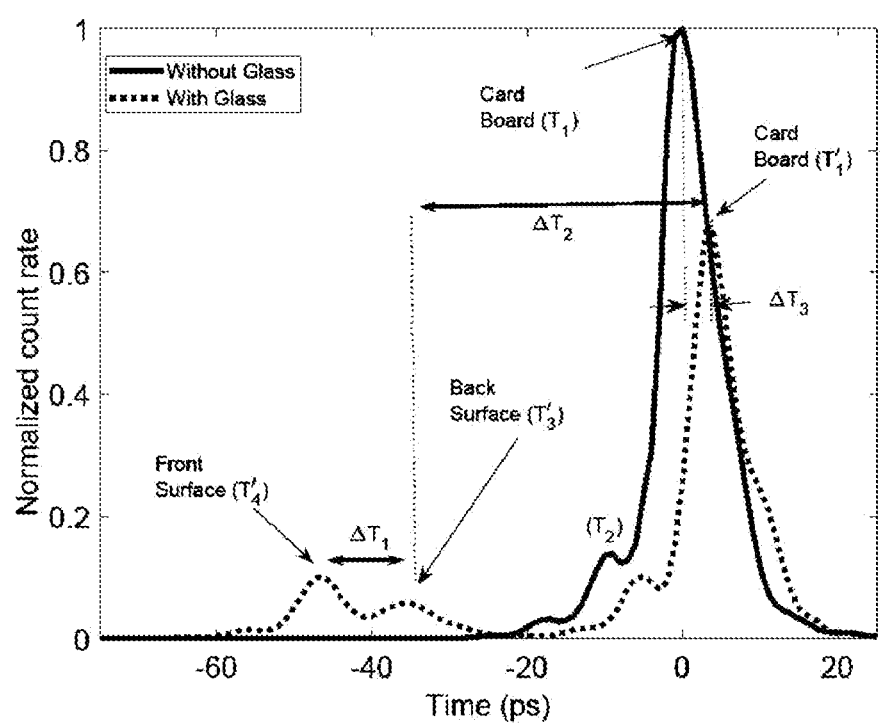
FIG. 6 shows characterization of a ranging resolution according to an embodiment of the present disclosure.

FIG. 6 shows characterization of the ranging resolution according to an embodiment of the present subject matter. In FIG. 5, the detection rate is plotted as the temporal delay is scanned between the pump and backscattered photon pulses. The zero delay time $T_1$ is defined at the location of the peak backscattered photon counts by the card board. Then, in some embodiments, the present invention repeats the measurement with the glass slide. The result is shown in FIG. 6, where the main peak, still by photon backscattering at the card board, is now shifted to $T_1'$=3.48 ps. This shows that the optical path is effectively elongated by $c(T_1'-T_1)$=1 mm, which is expected as the photons now double pass a 1.15 mm glass with ~1.5 refractive index. The other two peaks at $T_4'=46.63$ ps and $T_3'=-35.45$ ps show the photons backscattered by the front and back surfaces of the glass, respectively. The distance between the glass and the card board is then derived as:

$$L_2' = \frac{c(T_1' - T_3')}{2} = 5.85 \text{ mm}$$

$$t' = \frac{c(T_3' - T_4')}{2n} = 1.12 \text{ mm}$$

Both are in good agreement with the measured values using a caliper. In addition, the surface reflectivity of the illuminated objects can be inferred by comparing the peak photon counts. For example, in FIG. 6 the reduced counts from the back surface of the glass slide and from the cardboard indicate 4% Fresnel reflections loss at glass/air interfaces and 1 dB absorption loss in the glass slide. This result shows that the proposed transceiver system can resolve objects ~1 mm away from each other while also providing information on their surface reflectivity. This millimetric ranging resolution is derived from the picosecond temporal resolution in the ToF measurement and is limited only by the pulse width of the pump and signal. It will be useful for three-dimensional terrestrial mapping with an extremely high ranging resolution and three-dimensional machine vision with an excellent depth of field. In view of the speed limitation of the temporal scanning, a practical system may combine both direct detection and PMSD to attain longer probing range. For 2-dimensional mapping or imaging purpose, the reflectivity or backscattering coefficient can be retrieved by scanning both azimuth and elevation angles. Further temporal scanning of the driving pump pulse will allow one to obtain the depth imaging, thus completing a three-dimensional vision mapping. The reflectivity (2D) and depth mapping can be retrieved separately for faster signal acquisition time. The system complexity and signal acquisition time can be reduced by applying compressive or sparsely sampling techniques where reflectivity and depth mapping can be recovered from an undersampled series of angular and temporal resolved photon counting measurement.

Figure 7:
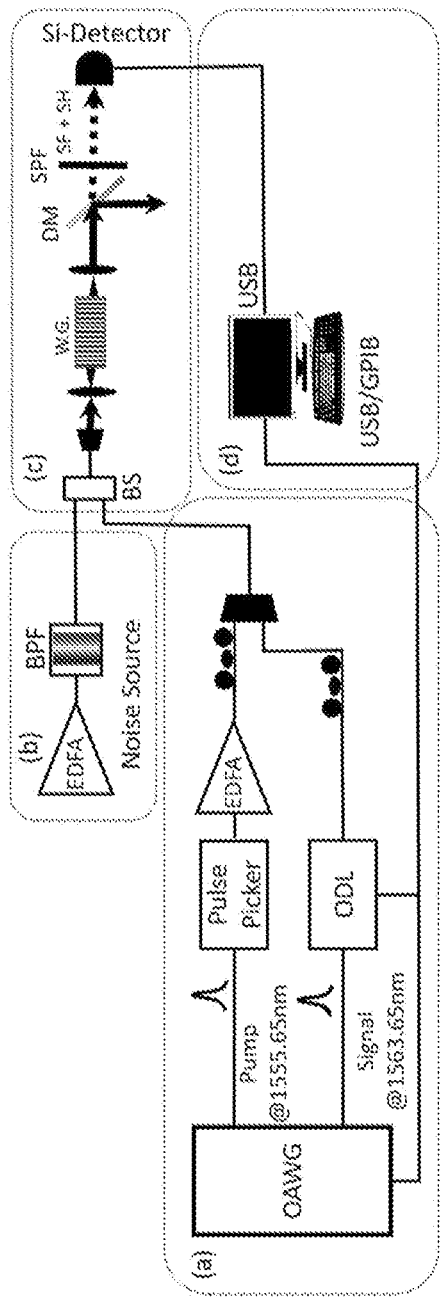
FIG. 7 shows another exemplary demonstration of (a) pulse generation and timing units, (b) noise source unit and (c) detection unit and (d) control and processing unit according to an embodiment of the present disclosure.

Example Device Configuration II:

FIG. 7 shows another exemplary demonstration of (a) pulse generation and timing units, (b) a noise source unit, (c) a detection unit and (d) a control and processing unit according to an embodiment of the present subject matter. In FIG. 7, the performance of the individual detection unit is evaluated against broadband noise and is compared with an ideal time frequency filtering method which has been the conventional method for detecting a signal against broadband noise.

TF filters are the optimum linear systems for signal detection over interfering noise, such as those overlapping in both spectral and time domains. For the measurement and processing of non-stationary signals, in particular, it is a key tool widely employed to attain a high signal-to-noise ratio (SNR). There is, however, a fundamental tradeoff between the selection (detection) efficiency (i.e., the signal transmittance through the filter) and the noise rejection. On the one hand, to admit the signal with a higher efficiency, a wider TF filtering window is needed which unfortunately will also let through more noise. On the other hand, a tight window can reject most of the noise but at the price of a higher signal loss.

Figure 8A:
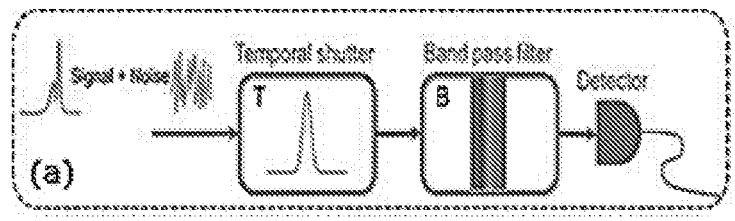
FIGS. 8(*a*) and 8(*b*) show simplified schematics for a typical time-frequency (TF) filter and a waveguide-based parametric mode sorting detector (PMSD) system, respectively, according to some embodiments of the present disclosure.
Figure 8B:
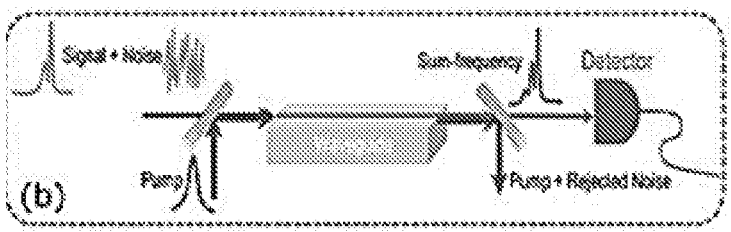
Figure 8C:
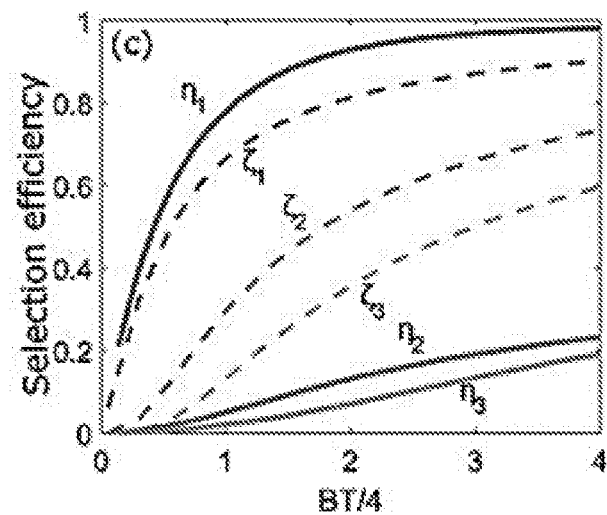

To illustrate this, a typical TF filter consisting of a temporal shutter with a Gaussian profile followed by a Gaussian-shape bandpass filter is considered. FIGS. 8(a)-(c) show TF filtering versus PMSD according to an embodiment of the present subject matter. FIGS. 8(a) and (b) show simplified schematics for a typical TF filter and a waveguide-based PMSD system, respectively according to some embodiments. FIG. 8(c) shows selection efficiencies of the first three signal modes $\{\zeta_i\}$ for the TF filter in FIG. 8(a) and $\{\eta_i\}$ for PMSD system in FIG. 8(b), as a function of the time-bandwidth product according to some embodiments.

Specifically, reference is made to FIG. 8(a), whose full-width half-maximum (FWHM) are T and B, respectively. By the standard analysis, the filter's normal modes (i.e., eigenmodes of its transform function between input and output) and their selection efficiencies (the eigenvalues), $\{\zeta_i\}$, are computed as a function of the filter's time-bandwidth product BT/4. This is numerically done by discretizing the transform function and then performing single-value decomposition. Arranging the modes by descending efficiency, the best performance that the filter can theoretically achieve is when the detected signal is in the first normal mode. In FIG. 8(c), $\zeta_i$ for the first three modes is plotted. As seen, while a larger time-bandwidth product helps transmit the signal, the selection efficiencies for the rest modes increase, too, even more significantly. When the selection efficiency of the signal in the first mode reaches 90%, the efficiency for the second and third normal modes reaches 70% and 60% respectively. As a result, a high signal selection efficiency comes necessarily at the price of high noise.

Figure 9:
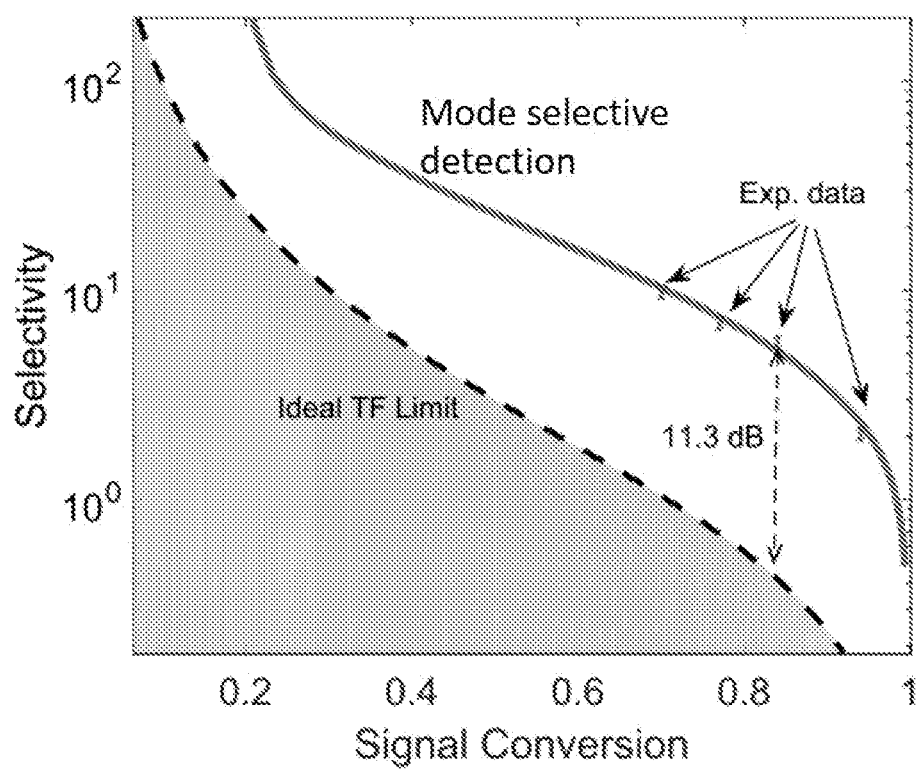
FIG. 9 is a graph illustrating a characterization of a proposed detection unit compared with an ideal time frequency filtering method according to an embodiment of the present disclosure.

To quantify this tradeoff, in FIG. 9, which shows characterization of the proposed detection unit compared with an ideal time frequency filtering method according to an embodiment of the present subject matter, the signal selectivity S is plotted versus the selection efficiency, where S is defined as $\zeta_1/\Sigma\zeta_j$, for $j>1$. In practice, S amounts to the SNR when the signal in the first mode is accompanied by broadband noise spanning many other orthogonal modes, with each's occupation equal to the signal. As seen in FIG. 9, for a signal selection efficiency of 80%, the selectivity is −2.5 dB. It should be noted that this tradeoff behavior does not pertain to the specific profile choices of the time shutter and bandpass filter, but similarly applies to all TF settings.

The above tradeoff between the signal selection efficiency and noise rejection fundamentally limits the capabilities in measuring and processing weak signals buried in strong background noise.

By contrast, the PMSD approach improves the tradeoff inherent with the TF filters, thereby enabling faithful measurement and processing of weak signals even in the presence of strong interfering noise (e.g., those overlapping in both frequency and time). This approach exploits ultrafast nonlinear optics at the edge of phase matching. For frequency conversion, it is customary to use optical waves satisfying phase matching. However, by driving the frequency conversion with ultrafast pulses whose temporal width is shorter than the reciprocal of the phase matching bandwidth, interesting phenomena can occur where only photons in a single spatiotemporal mode are converted efficiently. The other modes, even those spanning both the same spectrum and time, are not converted or converted with a much lower efficiency. This realizes PMSD whereby a signal is picked out of overlapping noises, similar to the TF filtering. Yet, thanks to coherent nonlinear effects, a significant advantage can be established over the TF filtering approach.

As a specific example, a second-order nonlinear ($\chi^{(2)}$) waveguide is considered with phase matching bandwidth B driven by pump pulses in a Gaussian temporal profile with FWHM, T. The selection (i.e., conversion or detection) efficiencies, $\{\eta_i\}$, for the leading normal modes are calculated by normal-mode decomposition of the Green's function describing the input-output relation of the waveguide (which is numerically carried out via single-value decomposition, as $\{\zeta_i\}$ are computed). The results are plotted in FIG. 8(c) as a function of BT/4. As shown, comparing with the TF filtering, a higher efficiency for the first mode and lower efficiencies for the other modes are obtained simultaneously at all time. It means that for the same efficiency, a much stronger noise rejection can be achieved, and vice versa. To benchmark this, in FIG. 9 the selectivity S (defined similarly as for the TF filtering in the presence of broadband noise) is plotted versus the signal selection efficiency $\eta_1$, which reveals a substantially improved performance from the TF filtering approach. For example, for the same signal selection efficiency at 80%, the selectivity is 8 dB for the current PMSD while only −2.5 dB for the TF filter, marking an improvement over 10 dB.

In the above comparison, the signals are assumed to coincide with the first normal mode of each system. Thus, the results in FIG. 8(c) and FIG. 9 represent the best possible performance for those systems. In practice, however, the signal may vary from system to system and time to time. Matching the first normal mode of a TF filter to an arbitrary signal mode poses a challenge, especially when the signal contains multiple power peaks in time or spectrum. In contrast, with PMSD one can indirectly tailor the mode profiles and structures conveniently by optimally modulating the pump pulses via an optical arbitrary waveform generator (OAWG).

The above performance is also demonstrated in an experiment, where in the pulse generation unit, shown in FIG. 7 (see dotted box (a)), the shaped driving pump and signal pulses are generated through OAWG based on spectral line-by-line pulse shaping. It includes an optical frequency comb generator and a reconfigurable optical processor (also called waveshaper) to create waveforms in desirable amplitude and phase profiles. Here, the amplitudes and relative phases of 25-GHz evenly spaced frequency comb lines, generated by an optical frequency comb generator (WTEC-01-25), are each manipulated using a reconfigurable optical processor (Finisar 16000A). Accessing to more than 100 comb lines, this system is capable of creating sub-picosecond pulses in arbitrary amplitude and phase profiles.

Two outputs of the OAWG are employed as the driving pump and signal pulse trains at 1555.65 nm and 1563.65 nm, respectively, which is the optimal choice given the constraints of the OAWG and the waveguide's phase matching (NLO module) used for this specific demonstration. The pulse repetition rate of the pump can be reduced from 25 GHz down to 1 GHz by using a high-speed pulse picking system based on electro-optical modulation. The pump is amplified by an adjustable-gain erbium-doped fiber amplifier (EDFA) to achieve the required peak power (varying around 5 W) determined by numerical simulation followed by a fiber polarization controller (FPC). The signal passes through a programmable optical delay line (HD4 JDS Fitel) as the timing unit and an FPC, the former controlled by an automation software to scan the temporal delay between the driving pump and signal for measurement. The resultant pump and signal are combined using a WDM filter and coupled into a 1-cm waveguide with phase matching bandwidth of 200 GHz. At the spectral filtering module, the pump and signal are first separated from the generated sum frequency (SF) and undesirable second-harmonic (SH) waves by using a dichroic mirror. For the SF wave, a short-pass filter is used to additionally filter out the pump, before being measured using a silicon photodiode, e.g., a power meter. The optical delay line and power meter are controlled by the control and processing unit, as in FIG. 7 (see dotted box (c)), so that the SF is measured simultaneously as the pump and signal are relatively delayed. The measured power also contains a small contribution from the weak but non-vanishing generated SH despite phase mismatching which is subtracted from the measured total power. To simulate the broadband noise, in some embodiments, the present invention creates a broadband noise utilizing the amplified spontaneous emission (ASE) of an adjustable gain EDFA, whose output is filtered by a WDM filter centered at the signal wavelength (FWHM bandwidth: 4 nm). The photon occupation of each mode is then computed from the total beam power, using the facts that the mode occupation is uniform within the WDM band and the ASE is un-polarized. The noise and signal are then combined at a beam splitter. For the same pump, the SF light power from the noise and the signal are measured individually.

As shown in FIG. 9, the SNR (also called selectivity) is calculated by normalizing the photon occupation of the noise modes to match with the signal, which turns out to be 7.5 dB. In contrast, the upper limit achievable with a Gaussian TF filtering is −3.8 dB at the detection efficiency (also called conversion efficiency) of 84%. This amounts to an improvement from the theoretical limit of the TF filtering by 11.3 dB. As seen in FIG. 9, these measurement results lie right on top of the theoretical curve from simulation without the use of any fitting parameter, which clearly validates anticipations.

Although the various embodiments of the present invention detailed herein describe or illustrate particular operations as occurring in a particular order, the present invention contemplates any suitable operations occurring in any suitable order. Moreover, the present invention contemplates any suitable operations being repeated one or more times in any suitable order. Although the present invention describes or illustrates particular operations as occurring in sequence, the present invention contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

All examples and conditional language recited herein are intended for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same.

The invention claimed is:

1. A system comprising:
   a pulse generation unit configured to create probe signals and trigger a driving pump in synchronized waveforms having pulsed amplitude and phase profiles;
   a collimation and scanning unit configured to collimate the probe signals, direct the probe signals towards a target, and collect backscattered signals of the probe signals;
   a timing unit configured to temporally align the driving pump with the backscattered signals of the probe signals; and
   a mode selective detection unit configured to perform mode-selective frequency conversion of the collected backscattered signals and detect the converted signals.

2. The system of claim 1, wherein the mode selective detection unit is configured to translate a frequency of the collected backscattered signals from an infrared wavelength to a visible wavelength, or from one visible wavelength to a second wavelength, to filter the translated signals and perform frequency conversion of the filtered signals, and to detect the converted signals.

3. The system of claim 2, wherein the mode selective detection unit includes a nonlinear optical (NLO) module configured to translate the frequency of the collected backscattered signals from a near-infrared (NIR) or mid-infrared (MIR) wavelength to a visible wavelength, or from a visible wavelength to another wavelength.

4. The system of claim 3, wherein the mode selective detection unit further includes a spectral filtering module configured to filter the translated signals and perform frequency conversion of the filtered signals.

5. The system of claim 4, wherein the mode selective detection unit further includes a single photon detector configured to detect the converted signal.

6. The system of claim 5, wherein the single photon detector includes a silicon avalanche photodiode (Si-APD) configured to detect the converted signals in the visible spectrum.

7. The system of claim 1, wherein the pulse generation unit comprises a femtosecond fiber laser together with a set of wavelength division multiplexing (WDM) filters to carve out required waveforms.

8. The system of claim 1, wherein the pulse generation unit comprises an optical frequency comb generator and a reconfigurable optical processor to create the pump waveforms, said amplitude and the phase profiles enabling optimal mode selective conversion.

9. The system of claim 1, wherein the timing unit is configured to implement an optical delay line that can be scanned by mechanical or optical-switching means.

10. The system of claim 1, wherein the collimation and scanning unit includes a scanning module incorporating a micro electro mechanical system (MEMS) based mirror or a digital micromirror device.

11. The system of claim 1, further comprising a control and processing unit configured to control the operation of the pulse generation unit, the timing unit, the collimation and scanning unit, and/or the mode selective detection unit.

12. A method comprising the steps of:
   creating probe signals and triggering a driving pump in synchronized waveforms having pulsed amplitude and phase profiles;
   collimating the probe signals, directing the probe signals towards a target, and collecting backscattered signals of the probe signals;
   temporally aligning the driving pump with the backscattered signals of the probe signals;
   performing mode-selective frequency conversion of the collected backscattered signals; and
   detecting the converted signals.

13. The method of claim 12, wherein the performing step includes the steps of translating the frequency of the collected backscattered signals from a first wavelength to a second wavelength, filtering the translated signals, and performing detection of the filtered signals.

14. The method of claim 13, wherein the frequency of the collected backscattered signal is translated from an infrared wavelength to a visible wavelength.

15. The method of claim 13, wherein the performing step is performed using a mode selective detection unit which includes a nonlinear optical (NLO) module configured to translate the frequency of the collected backscattered signals from the first wavelength to the second wavelength.

16. The method of claim 15, wherein the frequency of the collected backscattered signals is translated from a near-infrared (NIR) or mid-infrared (MIR) wavelength to a visible wavelength or another NIR wavelength, or from a visible wavelength to a NIR wavelength or another visible wavelength.

17. The method of claim 16, wherein the mode selective detection unit further includes a spectral filtering module configured to filter the translated signals and perform frequency conversion and detection of the filtered signals.

18. The method of claim 17, wherein the mode selective detection unit further includes a single photon detection unit configured to detect the converted signals.

19. The method of claim 12, wherein the creating step is performed using a pulse generation unit including a femtosecond mode-locked fiber laser together with a set of wavelength division multiplexing (WDM) filters to carve out required waveforms.

20. The method of claim 12, wherein the creating step is performed using a pulse generation unit including an optical frequency comb generator and a reconfigurable optical processor to create the probe signal and driving pump waveforms, said amplitude and the phase profiles having efficient optimal mode selective frequency conversion.

21. The method of claim 12, wherein the aligning step is performed using a timing unit configured to implement an optical delay line that can be scanned by mechanical or optical switching means.

22. The method of claim 12, wherein the collimating step is performed using a collimation and scanning unit which includes a scanning module incorporating a micro electro mechanical system (MEMS) based mirror or a digital micromirror device.

23. The method of claim 12, wherein the creating step is performed using a pulse generating unit, the temporal aligning step is performed using a timing unit, the collimating step is performed using a collimation and scanning unit, and the performing and detecting steps are performed using a mode selective detection unit, a control and processing unit controlling the operation of the pulse generation unit, the timing unit, the collimation and scanning unit, and/or the mode selective detection unit.

* * * * *